(12) United States Patent
Kim et al.

(10) Patent No.: US 10,781,889 B2
(45) Date of Patent: Sep. 22, 2020

(54) POWER TRANSMISSION APPARATUS OF A HYBRID ELECTRIC VEHICLE

(71) Applicants: Hyundai Motor Company, Seoul (KR); Kia Motors Corporation, Seoul (KR)

(72) Inventors: Wan Soo Kim, Hwaseong-si (KR); Tal Chol Kim, Bucheon-si (KR); Yeongil Choi, Suwon-si (KR); Yeonho Kim, Suwon-si (KR); Kyungha Kim, Yongin-si (KR); Shin Jong Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 50 days.

(21) Appl. No.: 16/204,898

(22) Filed: Nov. 29, 2018

(65) Prior Publication Data

US 2020/0062102 A1 Feb. 27, 2020

(30) Foreign Application Priority Data

Aug. 22, 2018 (KR) .................... 10-2018-0098119

(51) Int. Cl.

| F16H 3/72 | (2006.01) |
|---|---|
| B60K 6/365 | (2007.10) |
| B60K 6/442 | (2007.10) |
| B60K 6/547 | (2007.10) |
| F16H 3/66 | (2006.01) |
| F16H 3/44 | (2006.01) |

(52) U.S. Cl.
CPC ............ *F16H 3/727* (2013.01); *B60K 6/365* (2013.01); *B60K 6/442* (2013.01); *B60K 6/547* (2013.01); *F16H 3/663* (2013.01); *B60Y 2200/92* (2013.01); *F16H 2003/445* (2013.01); *F16H 2200/006* (2013.01); *F16H 2200/0052* (2013.01); *F16H 2200/0078* (2013.01); *F16H 2200/2007* (2013.01); *F16H 2200/2023* (2013.01); *F16H 2200/2046* (2013.01); *F16H 2200/2066* (2013.01); *F16H 2200/2082* (2013.01)

(58) Field of Classification Search
CPC .... F16H 3/663; F16H 3/727; F16H 2003/445; F16H 2200/2007; F16H 2200/202–2028
See application file for complete search history.

(56) References Cited

U.S. PATENT DOCUMENTS 7,473,200 B2 * 1/2009 Raghavan ............... F16H 3/728
475/5

* cited by examiner

*Primary Examiner* — Erin D Bishop
(74) *Attorney, Agent, or Firm* — Morgan, Lewis & Bockius LLP

(57) ABSTRACT

A power transmission apparatus of a hybrid electric vehicle may include an input shaft receiving an engine torque, an output shaft disposed at a same axis with the input shaft and outputting a shifted torque, first and second motor/generators, a first shifting section including a compound planetary gear set formed as a combination of first and second planetary gear sets, forming an adjusted torque from the engine torque received through two paths and torques of the first and second motor/generators, and outputting the adjusted torque, and a second shifting section including a third planetary gear set and outputting a shifted torque of two stages from a torque received from the first shifting section to the output shaft.

17 Claims, 5 Drawing Sheets

FIG. 2

|       | OWC | BK1 | BK2 | C1 | C2 | C3 |
|-------|-----|-----|-----|----|----|----|
| EV1   | ●   |     | ●   | ●  |    |    |
| EV2   | ●   |     |     | ●  |    | ●  |
| I/S 1-1 |   |     | ●   | ●  |    |    |
| I/S 1-2 |   |     |     | ●  |    | ●  |
| I/S 2-1 |   |     | ●   |    | ●  |    |
| I/S 2-2 |   |     |     |    | ●  | ●  |
| P1    |     | ●   | ●   |    | ●  |    |
| P2    |     |     | ●   | ●  | ●  |    |
| P3    |     | ●   | ●   | ●  |    |    |
| P4    |     | ●   |     |    | ●  | ●  |
| P5    |     |     |     | ●  | ●  | ●  |
| P6    |     | ●   |     | ●  |    | ●  |

FIG. 4

|       | OWC | BK1 | BK2 | C1 | C2 | C3 |
|-------|-----|-----|-----|----|----|----|
| EV1   | ●   |     | ●   |    |    |    |
| EV2   | ●   |     |     |    |    | ●  |
| I/S 1-1 |   |     | ●   | ●  |    |    |
| I/S 1-2 |   |     |     | ●  |    | ●  |
| I/S 2-1 |   |     | ●   |    | ●  |    |
| I/S 2-2 |   |     |     |    | ●  | ●  |
| P1    | ●   |     | ●   |    | ●  |    |
| P2    | ●   |     |     |    | ●  | ●  |
| P3    |     | ●   | ●   |    | ●  |    |
| P4    |     |     | ●   | ●  | ●  |    |
| P5    |     | ●   | ●   | ●  |    |    |
| P6    |     | ●   |     |    | ●  | ●  |
| P7    |     |     |     | ●  | ●  | ●  |
| P8    |     | ●   |     | ●  |    | ●  |

POWER TRANSMISSION APPARATUS OF A HYBRID ELECTRIC VEHICLE

CROSS-REFERENCE TO RELATED APPLICATION

The present application claims priority to Korean Patent Application No. 10-2018-0098119 filed on Aug. 22, 2018, the entire contents of which is incorporated herein for all purposes by this reference.

BACKGROUND OF THE INVENTION

Field of the Invention

The present invention relates to a power transmission apparatus of a hybrid electric vehicle.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can acquire a significant fuel efficiency enhancement effect as compared with the conventional vehicle through idle stop of stopping the engine when the vehicle stops, fuel saving by regenerative braking that drives a generator by use of kinetic energy of the vehicle instead of braking by the existing friction when the vehicle is braked, and stores in a battery electrical energy generated at the time of driving the generator and reuses the stored electrical energy in driving the vehicle, and the like.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus of a hybrid electric vehicle having an advantage of high performance and dynamic drivability.

An exemplary power transmission apparatus of a hybrid electric vehicle may include an input shaft, an output shaft, first and second motor/generators, a first shifting section, and a second shifting section. The input shaft may receive an engine torque output from an engine. The output shaft may be disposed at a same axis with the input shaft and outputting a shifted torque. The first shifting section may include a compound planetary gear set formed as a combination of first and second planetary gear sets, form an adjusted torque from the engine torque received through two paths and torques of the first and second motor/generators, and output the adjusted torque. The second shifting section may include a third planetary gear set and output a shifted torque of two stages from a torque received from the first shifting section to the output shaft.

The compound planetary gear set may form first, second, third, and fourth rotation elements by the combination of the first and second planetary gear sets. The third planetary gear set may form a fifth rotation element, a sixth rotation element, and a seventh rotation element.

The power transmission apparatus may further include a first shaft fixedly connected to the third rotation element and selectively connectable to the input shaft, a second shaft fixedly connected to the second rotation element and selectively connectable to the input shaft, a third shaft fixedly connected to the sixth rotation element and fixedly connected to the output shaft, and a plurality of shafts each connecting a corresponding rotation element fixedly or selectively to at least one of a transmission housing, the first and second motor/generators, the corresponding rotation element being a rotation element of the first to third planetary gear sets which is not interconnected any other rotation element.

The plurality of shafts may include a fourth shaft fixedly connected to the fourth rotation element and the fifth rotation element, a fifth shaft fixedly connected to the first rotation element and the first motor/generator and selectively connectable to the transmission housing, and a sixth shaft fixedly connected to the seventh rotation element and selectively connectable to the transmission housing wherein the third shaft and the fourth shaft are selectively interconnected.

The power transmission apparatus may further include three clutches each selectively connecting a corresponding pair among the shafts, and two brakes selectively connecting the fifth shaft and the sixth shaft to the transmission housing.

The three clutches may include a first clutch disposed between the input shaft and the first shaft, a second clutch disposed between the input shaft and the second shaft, and a third clutch disposed between the third shaft and the fourth shaft. The two brakes may include a first brake disposed between the fifth shaft and the transmission housing, and a second brake disposed between the sixth shaft and the transmission housing.

The first planetary gear set may be a single pinion planetary gear set having a first sun gear, a common planet carrier, and a common ring gear. The second planetary gear set may be a double pinion planetary gear set having a first sun gear, the common planet carrier, and the common ring gear. The compound planetary gear set may form first, second, third, and fourth rotation element as the first sun gear, the second sun gear, the common planet carrier, and the common ring gear respectively. The third planetary gear set may be a single pinion planetary gear set having a third sun gear, a third planet carrier, and a third ring gear respectively forming a fifth rotation element, a sixth rotation element, and a seventh rotation element.

The input shaft is limited to rotate to one direction by a one-way clutch disposed between the input shaft and the transmission housing.

The first shaft is limited to rotate to one direction by a one-way clutch disposed between the first shaft and the transmission housing.

The plurality of shafts may include a fourth shaft fixedly connected to the fourth rotation element and the fifth rotation element, a fifth shaft fixedly connected to the first rotation element and the first motor/generator and selectively connectable to the transmission housing, and a sixth shaft fixedly connected to the seventh rotation element and selectively connectable to the transmission housing, wherein the third shaft and the fourth shaft are selectively interconnected.

A power transmission apparatus of a hybrid electric vehicle according to an exemplary embodiment enables usage of first and second motor/generators while driving in a parallel mode of multiple shifting stages, providing high performance and dynamic drivability.

Furthermore, a power transmission apparatus of a hybrid electric vehicle according to an exemplary embodiment enables driving in a second forward speed in two different patterns while driving in an EV mode and a torque splitting mode, improving fuel economy.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart of a power transmission apparatus of a hybrid electric vehicle according to various exemplary embodiments of the present invention.

FIG. 4 is a shifting operation chart of a power transmission apparatus of a hybrid electric vehicle according to various exemplary embodiments of the present invention.

Figure 1:
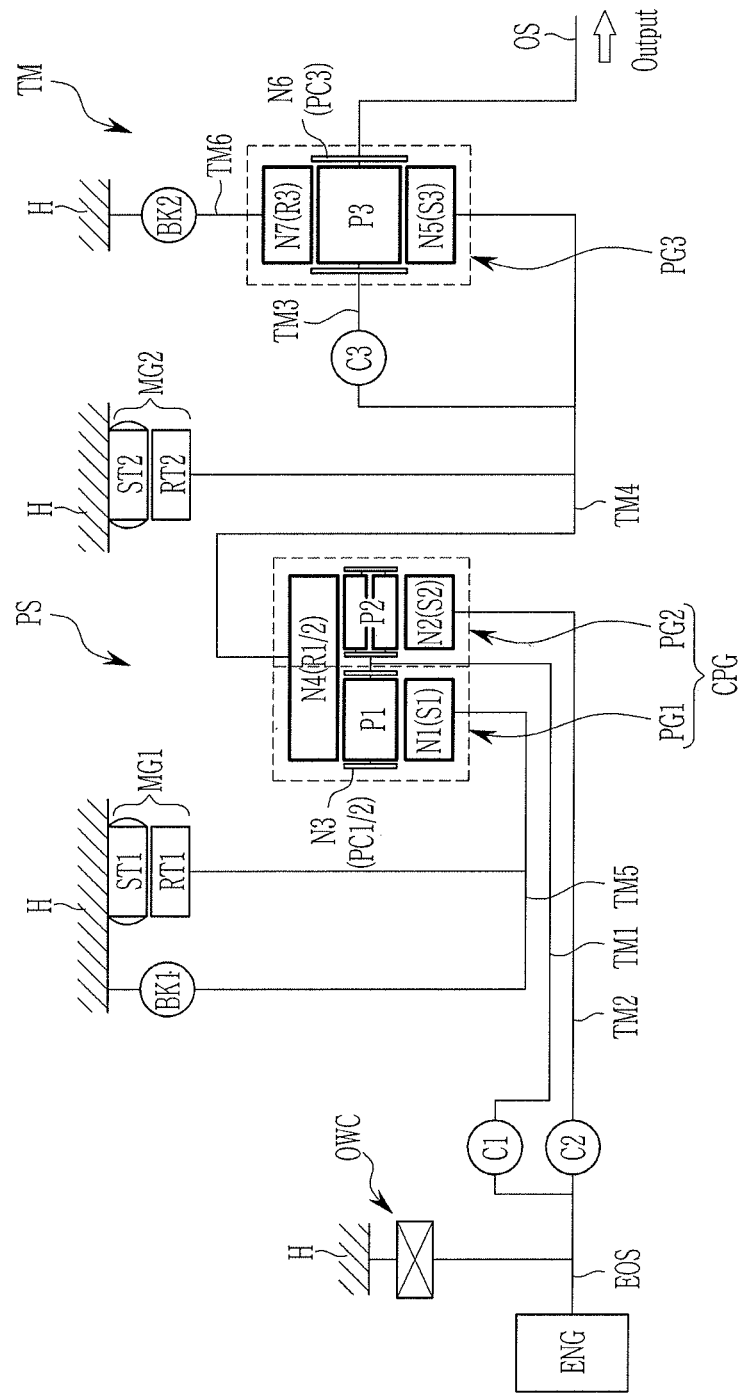
FIG. 1 is a schematic diagram of a power transmission apparatus of a hybrid electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus of a hybrid electric vehicle according to various exemplary embodiments of the present invention.

Referring to FIG. 1, a power transmission apparatus of a hybrid electric vehicle according to various exemplary embodiments of the present invention shifts torques of power sources of an engine ENG and first and second motor/generators MG1 and MG2, and may include an input shaft EOS receiving a torque output from the engine, a first shifting section PS outputting an adjusted torque from torques of the input shaft EOS and the first and second motor/generators MG1 and MG2, a second shifting section TM shifting the torque received from the first shifting section PS into a plurality of shifting stages, and an output shaft OS outputting a torque received from the second shifting section TM to a differential apparatus.

The engine ENG is a primary power source and a variety of typical engines such as a gasoline engine or a diesel engine that utilizes fossil fuel may be used as the engine ENG.

The first shifting section PS may include a compound planetary gear set CPG formed as a combination of first and second planetary gear sets PG1 and PG2, and the first and second motor/generators MG1 and MG2.

The compound planetary gear set CPG may include first and second planetary gear sets PG1 and PG2. The first planetary gear set PG1 is formed as a single pinion planetary gear set. The second planetary gear set PG2 is formed as a double pinion planetary gear set. The first and second planetary gear sets PG1 and PG2 shares a ring gear and a planet carrier, and thereby the compound planetary gear set CPG is formed as a Ravingneaux type planetary gear set.

As a result, the compound planetary gear set CPG forms four rotation elements of a common ring gear R1/2, a common planet carrier PC1/2, and first and second sun gears S1 and S2. The first sun gear S1 is engaged with a plurality of first pinion gears P1 and forms a first rotation element N1. The second sun gear S2 is engaged with a plurality of second pinion gears P2 and forms a second rotation element N2. The plurality of first pinion gears P1 and the plurality of second pinion gears P2 are rotatably supported by the common planet carrier PC1/2, and the common planet carrier PC1/2 forms a third rotation element N3. The plurality of first pinion gears P1 and the plurality of second pinion gears P2 are internally engaged with the common ring gear R1/2, and the common ring gear R1/2 forms a fourth rotation element N4.

Each of the first and second motor/generators MG1 and MG2 may act as a motor and also as a generator, and includes first and second stators ST1 and ST2 and first and second rotors RT1 and RT2, where the first and second stators ST1 and ST2 are fixed to the transmission housing H and the first and second rotors RT1 and RT2 are rotatably supported within the first and second stators ST1 and ST2.

The input shaft EOS is limited to rotate to one direction by a one-way clutch OWC disposed between the input shaft EOS and the transmission housing H.

The second shifting section TM includes a third planetary gear set PG3 of a single pinion planetary gear set.

The third planetary gear set PG3 includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a fifth rotation element N5, the third planet carrier PC3 acts as a sixth rotation element N6, and the third ring gear R3 acts as a seventh rotation element N7.

The fourth rotation element N4 and the fifth rotation element N5 are fixedly interconnected, and the compound planetary gear set CPG and the third planetary gear set PG3 form six shafts TM1 to TM6.

The six shafts TM1 to TM6 are disposed as follows.

The first shaft TM1 is fixedly connected to the third rotation element N3 (i.e., common planet carrier PC1/2), and selectively connectable to the input shaft EOS, selectively acting as an input element.

The second shaft TM2 is fixedly connected to the second rotation element N2 (second sun gear S2), and selectively connectable to the input shaft EOS thereby selectively acting as an input element.

The third shaft TM3 is fixedly connected to the sixth rotation element N6 (third planet carrier PC3), and fixedly connected to the output shaft OS, always acting as an output element.

The fourth shaft TM4 fixedly interconnects the fourth rotation element N4 (common ring gear R1/2) and the fifth rotation element N5 (third sun gear S3), and is fixedly connected to the second rotor RT2 of the second motor/generator MG2.

The fifth shaft TM5 fixedly interconnects the first rotation element N1 (first sun gear S1) and the first rotor RT1 of the first motor/generator MG1, and selectively connectable to the transmission housing H.

The sixth shaft TM6 is fixedly connected to the seventh rotation element N7 (third ring gear R3), and selectively connectable to the transmission housing H.

Each of the six shafts TM1 to TM6 may be a rotation member which is fixedly connected to the input and output shafts and rotation elements of the planetary gear set PG, or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged.

It may be understood that in the case that a member is "selectively connectable" with a transmission housing by an engagement element, the member may be stationary when the engagement element is engaged.

The first shaft TM1 and the second shaft TM2 are selectively connectable to the input shaft EOS respectively. The third shaft TM3 is selectively connectable to the fourth shaft TM4.

The fifth shaft TM5 and the sixth shaft TM6 is selectively connectable to the transmission housing H, selectively acting as a fixed element.

Five engagement elements of first, second, and third clutches C1, C2, and C3 and first and second brakes BK1 and BK2 are disposed between a corresponding pair of the nine shafts TM1 to TM6, the input shaft, the output shaft, the first and second motor/generators, and the transmission housing H, to form selective connections.

The three clutches C1, C2, and C3 and the two brakes B1 and B2 are disposed as follows.

The first clutch C1 is disposed between the input shaft EOS and the first shaft TM1, and selectively connects the input shaft EOS and the first shaft TM1, controlling power delivery therebetween.

The second clutch C2 is disposed between the input shaft EOS and the second shaft TM2, and selectively connects the input shaft EOS and the second shaft TM2, controlling power delivery therebetween.

The third clutch C3 is disposed between the third shaft TM3 and the fourth shaft TM4, and selectively connects the third shaft TM3 and the fourth shaft TM4, controlling power delivery therebetween.

The first brake BK1 is disposed between the fifth shaft TM5 and the transmission housing H, and selectively connects the fifth shaft TM5 to the transmission housing H.

The second brake B2 is disposed between the sixth shaft TM6 and the transmission housing H, and selectively connects the sixth shaft TM6 to the transmission housing H.

The third clutch C3 selectively connects two rotation elements of the third planetary gear set PG3, and forces the third planetary gear set PG3 to integrally rotate.

The engagement elements of the first, second, and third clutches C1, C2, and C3 and the first and second brakes BK1 and BK2 may be realized as multi-plate hydraulic pressure friction devices that are frictionally engaged by hydraulic pressure, however, it may not be understood to be limited thereto, since various other configuration that are electrically controllable may be available.

FIG. 2 is a shifting operation chart of a power transmission apparatus of a hybrid electric vehicle according to various exemplary embodiments of the present invention.

Referring to FIG. 2, a power transmission apparatus of a hybrid electric vehicle according to various exemplary embodiments of the present invention may realize an electric vehicle driving mode EV mode or a torque splitting mode VS, parallel driving mode P (i.e., engine driving mode as well as hybrid driving mode), depending on operation conditions of the clutches of the first, second, and third clutches C1, C2, and C3 and the one-way clutch OWC and power sources of the engine ENG and the first and second motor/generators MG1 and MG2.

[Ev1 Mode]

For the EV1 mode, the engine ENG is stopped, and the first clutch C1 and the second brake BK2 are operated while the second motor/generator MG2 is driven.

As such, in the first shifting section PS, by the operation of the first clutch C1 and the one-way clutch OWC, the first shaft TM1 acts as a fixed element. in the instant state, the second motor/generator MG2 is driven, and the torque of the second motor/generator MG2 is input to the second shifting section TM, and therefore, the first motor/generator MG1 is driven in a reverse direction thereof.

In the second shifting section TM, the sixth shaft TM6 acts as a fixed element by the operation of the second brake BK2. in the instant state, the torque of the second motor/generator MG2 is input through the fourth shaft TM4, and therefore, the third planetary gear set PG3 outputs a reduced speed through the third shaft TM3, realizing the EV1 mode.

In the EV1 driving mode, the reverse rotation of the first motor/generator MG1 and the forward rotation of the second motor/generator. MG may be independently controlled. That is, a hybrid electric vehicle may be driven by either or both of the torques of the first and second motor/generators MG1 and MG2.

When the second motor/generator MG2 is drive in the reverse direction thereof, driving in the reverse speed is realized.

[Ev2 Mode]

For the EV2 mode from the EV1 mode, the second brake BK2 is released and the third clutch C3 is operated.

As such, the first shifting section PS remains the same as in the EV1 mode. in the instant state, by the operation of the third clutch C3, the third planetary gear set PG3 of the second shifting section TM integrally rotates, and therefore, the third planetary gear set PG3 outputs the torque input through the fourth shaft TM4 as inputted, to the third shaft TM3, realizing the EV2 mode.

In the EV2 driving mode also, the reverse rotation of the first motor/generator MG1 and the forward rotation of the second motor/generator MG may be independently controlled. That is, a hybrid electric vehicle may be driven by either or both of the torques of the first and second motor/generators MG1 and MG2.

When the second motor/generator MG2 is drive in the reverse direction thereof, driving in the reverse speed is realized.

[Torque Splitting Mode I/S]

The torque splitting mode I/S may be classified into a first pattern of IS1-1 and a second pattern of IS2-I, depending on whether the first clutch C1 or the second clutch C2 is operated. The first pattern may be divided into an IS1-1 mode and an IS1-2 mode, and the second pattern may be divided into an IS2-1 mode and an IS2-2 mode, depending on where the third clutch C3 is operated. Depending on whether the first clutch C1 or the second clutch C2 is operated, the compound planetary gear set CPG receives the engine torque through different paths.

In the I/S 1-1 mode of the first pattern, torque splitting is realized by the operation of the first clutch C1 and the second brake B2, and in the I/S 1-2 mode, torque splitting is realized by the operation of the first clutch C1 and the third clutch C3.

In the I/S 2-1 mode of the second pattern, torque splitting is realized by the operation of the second clutch C2 and the second brake B2, and in the I/S 2-2 mode, torque splitting is realized by the operation of the second clutch C2 and the third clutch C3.

In such a torque splitting mode, the first motor/generator MG1 may assist driving torque for driving the hybrid electric vehicle.

In the parallel mode P, the vehicle may be driven in a hybrid driving mode HEV by the torque of the engine ENG and the torque of the first and second motor/generators MG1 and MG2, and may also be driven solely by the torque of the engine ENG.

[The Parallel Mode First Speed P1]

In the parallel mode first speed P1, the second clutch C2 and the first and second brakes BK1 and BK2 are simultaneously operated.

As such, in the first shifting section PS, the second shaft TM2 is connected to the input shaft EOS by the operation of the second clutch C2. in the instant state, the torque of the engine ENG is input to the second shaft TM2, and the fifth shaft TM5 acts as a fixed element by the operation of the first brake BK1. Therefore, the compound planetary gear set CPG outputs a reduced rotation speed through the fourth shaft TM4.

In the second shifting section TM, the third planetary gear set PG3 receives a torque through the fourth shaft TM4, and the sixth shaft TM6 acts as a fixed element by the operation of the second brake BK2, outputting a shifted torque through the third shaft TM3 and realizing the first forward speed.

At the instant time, the second motor/generator MG2 may be controlled to perform a toque-assist, i.e., to output an assist-torque.

[The Parallel Mode Second Speed P2]

In the parallel mode second speed P2, the first clutch and second clutch C1 and C2 and the second brake BK2 are simultaneously operated.

As such, in the first shifting section PS, the first shaft TM1 is connected to the input shaft EOS by the operation of the first clutch C1, and the second shaft TM2 is connected to the input shaft EOS by the operation of the second clutch C2. in the instant state, the torque of the engine ENG is simultaneously input to the compound planetary gear set CPG through two paths of the first shaft TM1 and the second shaft TM2, and therefore, the compound planetary gear set CPG outputs the same rotation speed as inputted, to the fourth shaft TM4.

In the second shifting section TM, the third planetary gear set PG3 receives a torque through the fourth shaft TM4, and the sixth shaft TM6 acts as a fixed element by the operation of the second brake BK2, outputting a shifted torque through the third shaft TM3 and realizing the second forward speed.

At the instant time, the first and second motor/generators MG1 and MG2 may be controlled to perform a toque-assist, i.e., to output an assist-torque.

[The Parallel Mode Third Speed P3]

In the parallel mode third speed P3, the first clutch C1 and the first and second brakes BK1 and BK2 are simultaneously operated.

As such, in the first shifting section PS, the first shaft TM1 is connected to the input shaft EOS by the operation of the first clutch C1. in the instant state, the torque of the engine ENG is input to the first shaft TM1, and the fifth shaft TM5 acts as a fixed element by the operation of the first brake BK1. Therefore, the compound planetary gear set CPG outputs an increased rotation speed to the fourth shaft TM4.

In the second shifting section TM, the third planetary gear set PG3 receives a torque through the fourth shaft TM4, and the sixth shaft TM6 acts as a fixed element by the operation of the second brake BK2, outputting a shifted torque through the third shaft TM3 and realizing the third forward speed.

At the instant time, the second motor/generator MG2 may be controlled to perform a toque-assist, i.e., to output an assist-torque.

[The Parallel Mode Fourth Speed P4]

In the parallel mode first speed P1, the second and third clutches C2 and C3 and the first brake BK1 are simultaneously operated.

As such, in the first shifting section PS, the second shaft TM2 is connected to the input shaft EOS by the operation of the second clutch C2. in the instant state, the torque of the engine ENG is input to the second shaft TM2, and the fifth shaft TM5 acts as a fixed element by the operation of the first brake BK1. Therefore, the compound planetary gear set CPG outputs a reduced rotation speed through the fourth shaft TM4.

In the second shifting section TM, the third planetary gear set PG3 receives a torque through the fourth shaft TM4. in the instant state, the third planetary gear set PG3 integrally rotates by the operation of the third clutch C3, and therefore, the third planetary gear set PG3 outputs the torque input through the fourth shaft TM4 as inputted, to the third shaft TM3, realizing the fourth forward speed.

At the instant time, the second motor/generator MG2 may be controlled to perform a toque-assist, i.e., to output an assist-torque.

[The Parallel Mode Fifth Speed P5]

In the parallel mode second speed P2, the first, second, and third clutches C1, C2, and C3 are simultaneously operated.

As such, in the first shifting section PS, the first shaft TM1 is connected to the input shaft EOS by the operation of the first clutch C1, and the second shaft TM2 is connected to the input shaft EOS by the operation of the second clutch C2. in the instant state, the torque of the engine ENG is simultaneously input to the compound planetary gear set CPG through two paths of the first shaft TM1 and the second shaft TM2, and therefore, the compound planetary gear set CPG outputs the same rotation speed as inputted, to the fourth shaft TM4.

In the second shifting section TM, the third planetary gear set PG3 receives a torque through the fourth shaft TM4. in the instant state, by the operation of the third clutch C3, the third planetary gear set PG3 of the second shifting section TM integrally rotates, and therefore, the third planetary gear set PG3 outputs the torque input through the fourth shaft TM4 as inputted, to the third shaft TM3, realizing the fifth forward speed.

At the instant time, the first and second motor/generators MG1 and MG2 may be controlled to perform a toque-assist, i.e., to output an assist-torque.

[The Parallel Mode Sixth Speed P6]

In the parallel mode sixth speed P6, the first and third clutches C1 and C3 and the first brake BK1 are simultaneously operated.

In the first shifting section PS, the first shaft TM1 is connected to the input shaft EOS by the operation of the first clutch C1. in the instant state, the torque of the engine ENG is input to the first shaft TM1, and the fifth shaft TM5 acts as a fixed element by the operation of the first brake BK1, outputting an increased rotation speed to the fourth shaft TM4.

In the second shifting section TM, the third planetary gear set PG3 receives a torque through the fourth shaft TM4. in the instant state, by the operation of the third clutch C3, the third planetary gear set PG3 of the second shifting section TM integrally rotates, and therefore, the third planetary gear set PG3 outputs the torque input through the fourth shaft TM4 as inputted, to the third shaft TM3, realizing the sixth forward speed.

At the instant time, the second motor/generator MG2 may be controlled to perform a toque-assist, i.e., to output an assist-torque.

Figure 3:
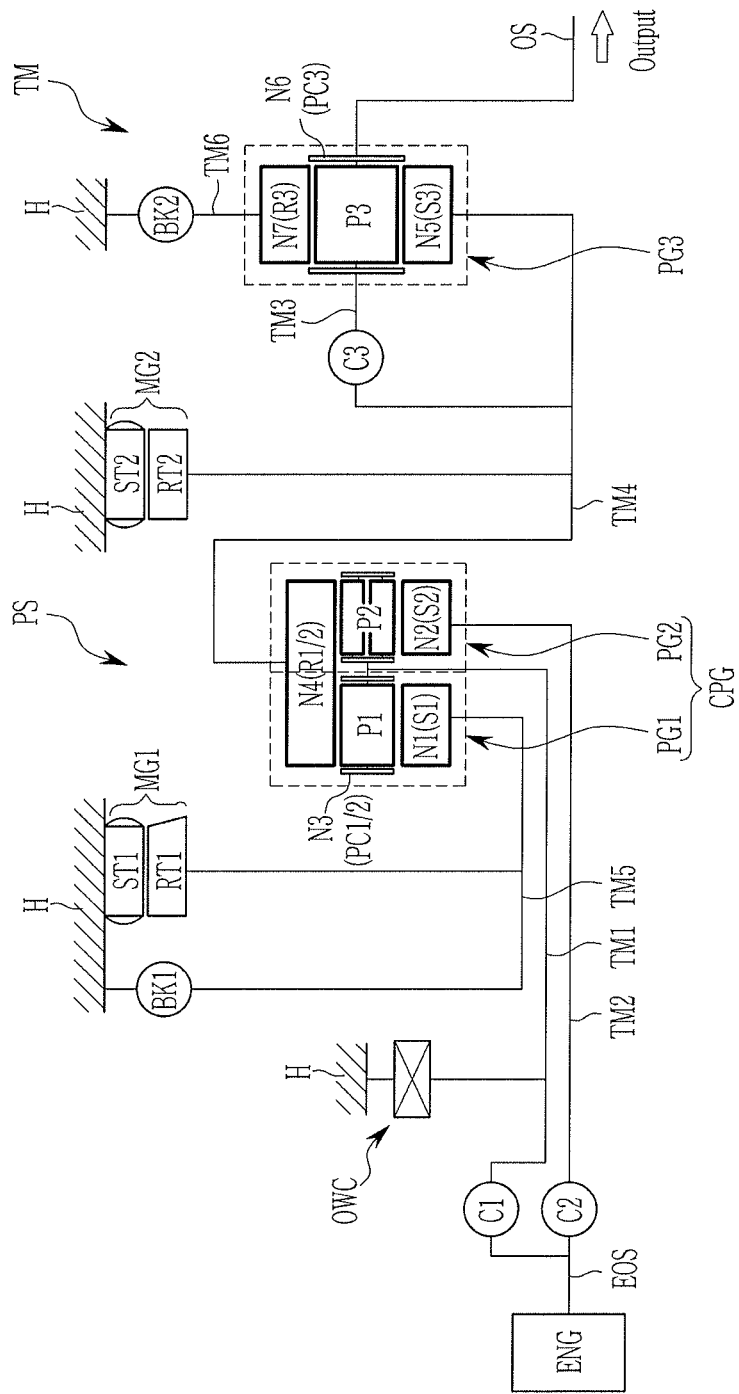
FIG. 3 is a schematic diagram of a power transmission apparatus of a hybrid electric vehicle according to various exemplary embodiments of the present invention.

FIG. 3 is a schematic diagram of a power transmission apparatus of a hybrid electric vehicle according to various exemplary embodiments of the present invention.

In comparison with a power transmission apparatus of various exemplary embodiments shown in FIG. 1 that employs the one-way clutch OWC between the input shaft EOS and the transmission housing H, various exemplary embodiments in FIG. 3 employs the one-way clutch OWC between the first shaft TM1 and the transmission housing H, as shown in FIG. 3. That is, the various exemplary embodiments in FIG. 3 merely differ from the various exemplary embodiments in FIG. 1 in the location of the one-way clutch, and operation and function of the various exemplary embodiments of the present invention, which is therefore not described in further detail.

FIG. 4 is a shifting operation chart of a power transmission apparatus of a hybrid electric vehicle according to various exemplary embodiments of the present invention in FIG. 3.

In comparison with the various exemplary embodiments of the present invention in FIG. 1, since a power transmission apparatus of a hybrid electric vehicle according to various exemplary embodiments employs the one-way clutch OWC between first shaft TM1 and the transmission housing H, the first clutch C1 may be released in the EV1 mode and the EV2 mode, as shown in FIG. 4.

The torque splitting mode of the various exemplary embodiments is realized by the same operation of engagement elements as the various exemplary embodiments.

The respective forward speeds in the parallel mode realized in the various exemplary embodiments may also be realized in the various exemplary embodiments by the same operation of the engagements. In addition to the forward speeds in the parallel mode realized in the various exemplary embodiments of the present invention, the various exemplary embodiments may realize two more forward shifting stages. The additional shifting stages are hereinafter referred to as the parallel mode first forward speed P1 and the second forward speed P2, and the third forward to eighth speeds in the various exemplary embodiments are the same as the first forward to sixth speeds in the various exemplary embodiments.

Therefore, the torque splitting I/S is not described in further detail, and shifting in the parallel mode P is hereinafter described.

[The Parallel Mode First Speed P1]

In the parallel mode first speed P1, the one-way clutch OWC and second clutch C2 and the second brake BK2 are simultaneously operated.

As such, in the first shifting section PS, the second shaft TM2 is connected to the input shaft EOS by the operation of the second clutch C2. in the instant state, the torque of the engine ENG is input to the second shaft TM2, and the first shaft TM1 acts as a fixed element by the operation of the one-way clutch OWC. Therefore, the compound planetary gear set CPG outputs a largely reduced rotation speed through the fourth shaft TM4.

In the second shifting section TM, the third planetary gear set PG3 receives a torque through the fourth shaft TM4, and the sixth shaft TM6 acts as a fixed element by the operation of the second brake BK2, outputting a shifted torque through the fourth shaft TM4 and realizing the second forward speed.

At the instant time, the first and second motor/generators MG1 and MG2 may be controlled to perform a toque-assist, i.e., to output an assist-torque.

[The Parallel Mode Second Speed P2]

In the parallel mode second speed P2, the one-way clutch OWC and second and third clutches C2 and C3 are simultaneously operated.

As such, in the first shifting section PS, the second shaft TM2 is connected to the input shaft EOS by the operation of the second clutch C2. in the instant state, the torque of the engine ENG is input to the second shaft TM2, and the first shaft TM1 acts as a fixed element by the operation of the one-way clutch OWC. Therefore, the compound planetary gear set CPG outputs a largely reduced rotation speed through the fourth shaft TM4.

In the second shifting section TM, the third planetary gear set PG3 receives a torque through the fourth shaft TM4. in the instant state, by the operation of the third clutch C3, the third planetary gear set PG3 of the second shifting section TM integrally rotates, and therefore, the third planetary gear set PG3 outputs the torque input through the fourth shaft TM4 as inputted, realizing the second forward speed.

At the instant time, the first and second motor/generators MG1 and MG2 may be controlled to perform a toque-assist, i.e., to output an assist-torque.

[The Parallel Mode Third Speed P3]

The same as the parallel mode first speed in the various exemplary embodiments (refer to FIG. 2), the parallel mode third speed P3 is realized by the operation of the second clutch C2 and the first and second brakes BK1 and BK2, which is therefore not described in further detail.

[The Parallel Mode Fourth Speed P4]

The same as the parallel mode second speed in the various exemplary embodiments (refer to FIG. 2), the parallel mode fourth speed P4 is realized by the operation of the first clutch and second clutch C1 and C2 and the first brake BK1, which is therefore not described in further detail.

[The Parallel Mode Fifth Speed P5]

The same as the parallel mode third speed in the various exemplary embodiments (refer to FIG. 2), the parallel mode fifth speed P5 is realized by the operation of the first clutch C1 and first and second brakes BK1 and BK2, which is therefore not described in further detail.

[The Parallel Mode Sixth Speed P6]

The same as the parallel mode fourth speed in the various exemplary embodiments (refer to FIG. 2), the parallel mode sixth speed P6 is realized by the operation of the second and third clutches C2 and C3 and the first brake BK1, which is therefore not described in further detail.

[The Parallel Mode Seventh Speed P7]

The same as the parallel mode fifth speed in the various exemplary embodiments (refer to FIG. 2), the parallel mode seventh speed P7 is realized by the operation of the first, second, and third clutches C1, C2, and C3, which is therefore not described in further detail.

[The Parallel Mode Eighth Speed P8]

The same as the parallel mode sixth speed in the various exemplary embodiments (refer to FIG. 2), the parallel mode eighth speed P8 is realized by the operation of the first, third clutch C1 and C3 and the first brake BK1, which is therefore not described in further detail.

Figure 5:
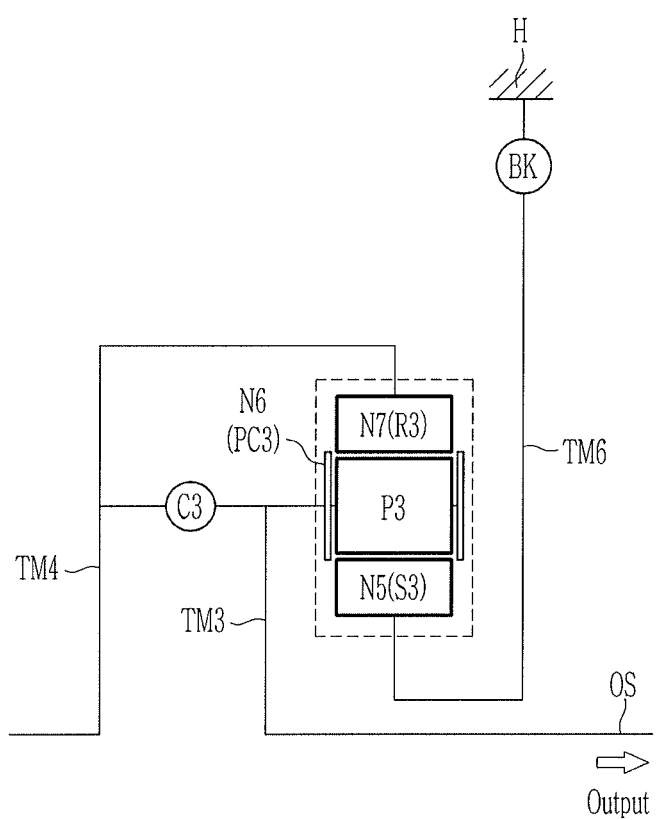
FIG. 5 is a schematic diagram of a second shifting section of a power transmission apparatus of a hybrid electric vehicle according to various exemplary embodiments of the present invention.

FIG. 5 is a schematic diagram of a second shifting section of a power transmission apparatus of a hybrid electric vehicle according to various exemplary embodiments of the present invention.

According to various exemplary embodiments shown in FIG. 5, the fourth shaft TM4 fixedly interconnects the fourth rotation element N4 and the seventh rotation element N7, and the sixth shaft TM6 is fixedly connected to the fifth rotation element N5, in comparison with the various exemplary embodiments where the fourth shaft TM4 fixedly interconnects the fourth rotation element N4 and the fifth rotation element N5, and the sixth shaft TM6 is fixedly connected to the seventh rotation element N7.

Although the various exemplary embodiments differ from the various exemplary embodiments in the above arrangement, remaining arrangement are the same and the same shafting operation is achieved by the same operation of engagement element, which is therefore not described in further detail.

A power transmission apparatus of a hybrid electric vehicle according to an exemplary embodiment enables usage of first and second motor/generators while driving in a parallel mode of multiple shifting stages, providing high performance and dynamic drivability.

Furthermore, a power transmission apparatus of a hybrid electric vehicle according to an exemplary embodiment enables driving in a second forward speed in two different patterns while driving in an EV mode and a torque splitting mode, improving fuel economy.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus of a hybrid electric vehicle, the power transmission apparatus comprising:
    an input shaft receiving an engine torque output from an engine;
    an output shaft mounted at a same axis with the input shaft and outputting a shifted torque;
    first and second motor/generators;
    a first shifting section engaged to the first and second motor/generators and including a compound planetary gear set formed as a combination of first and second planetary gear sets, forming an adjusted torque from the engine torque received through two paths and torques of the first and second motor/generators, and outputting the adjusted torque; and a second shifting section engaged to the first shifting section and the first and second motor/generators and including a third planetary gear set and outputting the shifted torque of two stages from the adjusted torque received from the first shifting section to the output shaft, wherein the compound planetary gear set forms a first rotation element, a second rotation element, a third rotation element, and a fourth rotation element by combination of the first and second planetary gear sets;

wherein the third planetary gear set forms a fifth rotation element, a sixth rotation element, and a seventh rotation element; and wherein the power transmission apparatus further includes:

a first shaft fixedly connected to the third rotation element and selectively connectable to the input shaft;

a second shaft fixedly connected to the second rotation element and selectively connectable to the input shaft;

a third shaft fixedly connected to the sixth rotation element and fixedly connected to the output shaft;

a fourth shaft fixedly connected to the second motor/generator and fixedly connected to two rotation elements of the first through seventh rotation elements that are not fixedly connected to any of the first to third shafts;

a fifth shaft fixedly and directly connected to the first motor/generator and selectively connectable to a transmission housing; and a sixth shaft selectively connectable to the transmission housing.

2. The power transmission apparatus of claim 1, wherein the fourth shaft is fixedly connected to the fourth rotation element and the fifth rotation element;

the fifth shaft is fixedly connected to the first rotation element and the first motor/generator and selectively connectable to the transmission housing; and the sixth shaft is fixedly connected to the seventh rotation element and selectively connectable to the transmission housing; and the third shaft and the fourth shaft are selectively connectable to each other.

3. The power transmission apparatus of claim 2, further including:

three clutches and two brakes.

4. The power transmission apparatus of claim 3, wherein the three clutches comprise:

a first clutch mounted between the input shaft and the first shaft;

a second clutch mounted between the input shaft and the second shaft; and a third clutch mounted between the third shaft and the fourth shaft, wherein the two brakes comprise:

a first brake mounted between the fifth shaft and the transmission housing; and a second brake mounted between the sixth shaft and the transmission housing.

5. The power transmission apparatus of claim 1, wherein the first planetary gear set is a single pinion planetary gear set having a first sun gear as the first rotation element, a common planet carrier as the third rotation element, and a common ring gear as the fourth rotation element;

wherein the second planetary gear set is a double pinion planetary gear set having a second sun gear as the second rotation element, the common planet carrier, and the common ring gear;

wherein the compound planetary gear set forms the first rotation element, the second rotation element, the third rotation element, and the fourth rotation element as the first sun gear, the second sun gear, the common planet carrier, and the common ring gear respectively; and wherein the third planetary gear set is a single pinion planetary gear set having a third sun gear, a third planet carrier, and a third ring gear that form the fifth rotation element, the sixth rotation element, and the seventh rotation element, respectively.

6. The power transmission apparatus of claim 1, wherein the input shaft is limited to rotate in a direction by a one-way clutch mounted between the input shaft and the transmission housing.

7. The power transmission apparatus of claim 1, wherein the first shaft is limited to rotate in a direction by a one-way clutch mounted between the first shaft and the transmission housing.

8. The power transmission apparatus of claim 1, wherein the fourth shaft is fixedly connected to the fourth rotation element and the seventh rotation element;

the fifth shaft is fixedly connected to the first rotation element and the first motor/generator and selectively connectable to the transmission housing;

the sixth shaft is fixedly connected to the fifth rotation element and selectively connectable to the transmission housing; and the third shaft and the fourth shaft are selectively connectable to each other.

9. The power transmission apparatus of claim 8, further including:

a first clutch mounted between the input shaft and the first shaft;

a second clutch mounted between the input shaft and the second shaft;

a third clutch mounted between the third shaft and the fourth shaft;

a first brake mounted between the fifth shaft and the transmission housing; and a second brake mounted between the sixth shaft and the transmission housing.

10. A power transmission apparatus of a hybrid electric vehicle, the power transmission apparatus comprising:

an input shaft receiving an engine torque;

an output shaft mounted at a same axis with the input shaft and outputting a shifted torque;

first and second motor/generators;

a compound planetary gear set forming first, second, third, and fourth rotation elements by a combination of first and second planetary gear sets;

a third planetary gear set forming a fifth rotation element, a sixth rotation element, and a seventh rotation element;

a first shaft fixedly connected to the third rotation element and selectively connectable to the input shaft;

a second shaft fixedly connected to the second rotation element and selectively connectable to the input shaft;

a third shaft fixedly connected to the sixth rotation element and fixedly connected to the output shaft;

a fourth shaft fixedly connected to the second motor/generator and fixedly connected to two rotation elements of the first through seventh rotation elements that are not fixedly connected to any of the first to third shafts;

a fifth shaft fixedly and directly connected to the first motor/generator and selectively connectable to a transmission housing;
a sixth shaft selectively connectable to the transmission housing;
three clutches; and
two brakes.

11. The power transmission apparatus of claim 10, wherein
the fourth shaft is fixedly connected to the fourth rotation element and the fifth rotation element;
the fifth shaft is fixedly connected to the first rotation element and the first motor/generator and selectively connectable to the transmission housing;
the sixth shaft is fixedly connected to the seventh rotation element and selectively connectable to the transmission housing; and
the third shaft and the fourth shaft are selectively connectable to each other.

12. The power transmission apparatus of claim 11, wherein the three clutches comprise:
a first clutch mounted between the input shaft and the first shaft;
a second clutch mounted between the input shaft and the second shaft; and
a third clutch mounted between the third shaft and the fourth shaft,
wherein the two brakes comprise:
a first brake mounted between the fifth shaft and the transmission housing; and
a second brake mounted between the sixth shaft and the transmission housing.

13. The power transmission apparatus of claim 10,
wherein the first planetary gear set is a single pinion planetary gear set having a first sun gear as the first rotation element, a common planet carrier as the third rotation element, and a common ring gear as the fourth rotation element;
wherein the second planetary gear set is a double pinion planetary gear set having a second sun gear as the second rotation element, the common planet carrier, and the common ring gear;
wherein the compound planetary gear set forms the first rotation element, the second rotation element, the third rotation element, and the fourth rotation element as the first sun gear, the second sun gear, the common planet carrier, and the common ring gear, respectively; and
wherein the third planetary gear set is a single pinion planetary gear set having a third sun gear, a third planet carrier, and a third ring gear that form the fifth rotation element, the sixth rotation element, and the seventh rotation element, respectively.

14. The power transmission apparatus of claim 10, wherein the input shaft is limited to rotate in a direction by a one-way clutch mounted between the input shaft and the transmission housing.

15. The power transmission apparatus of claim 10, wherein the first shaft is limited to rotate in a direction by a one-way clutch mounted between the first shaft and the transmission housing.

16. The power transmission apparatus of claim 10, wherein
the fourth shaft is fixedly connected to the fourth rotation element and the seventh rotation element;
the fifth shaft is fixedly connected to the first rotation element and the first motor/generator and selectively connectable to the transmission housing;
the sixth shaft is fixedly connected to the fifth rotation element and selectively connectable to the transmission housing; and
the third shaft and the fourth shaft are selectively connectable to each other.

17. The power transmission apparatus of claim 16, wherein the three clutches comprise:
a first clutch mounted between the input shaft and the first shaft;
a second clutch mounted between the input shaft and the second shaft; and
a third clutch mounted between the third shaft and the fourth shaft,
wherein the two brakes comprise:
a first brake mounted between the fifth shaft and the transmission housing; and
a second brake mounted between the sixth shaft and the transmission housing.

* * * * *